July 11, 1944.  A. SIMMON  2,353,512
PHOTOGRAPHIC ENLARGER
Filed May 5, 1943  2 Sheets-Sheet 1
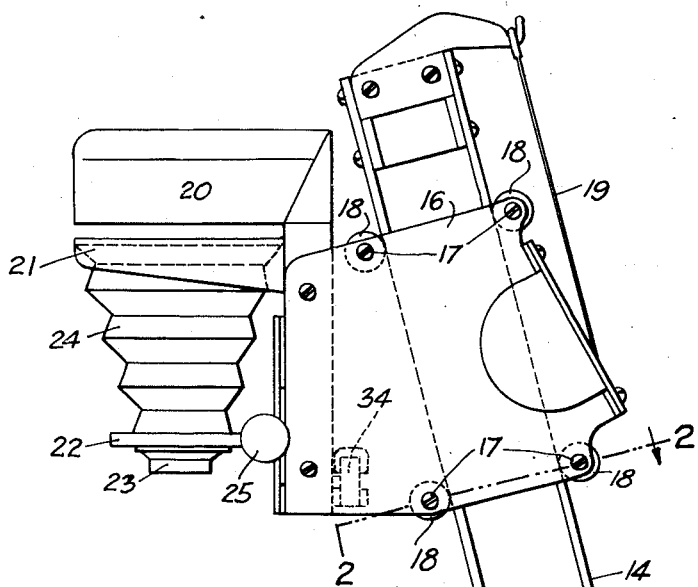
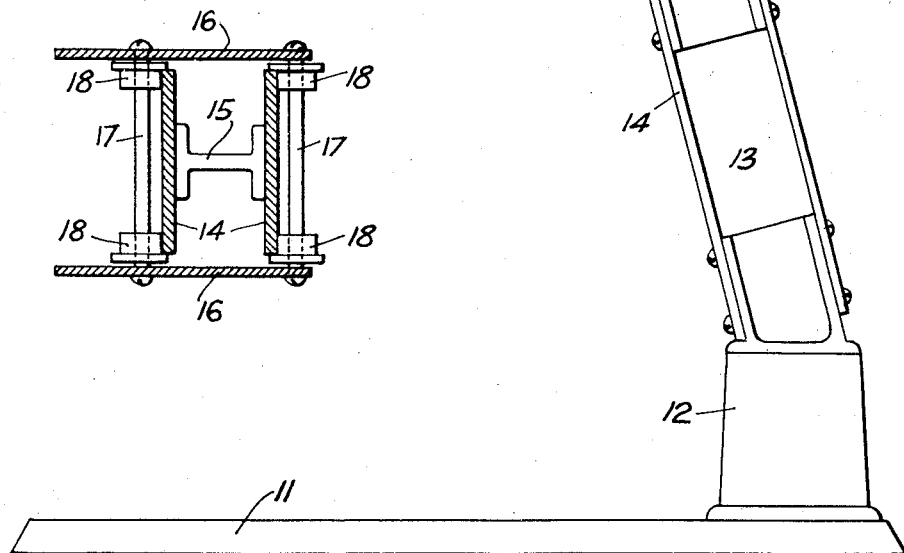
INVENTOR:
Alfred Simmon
BY Walter E. Wallheim
ATTORNEY.

July 11, 1944.                A. SIMMON                    2,353,512
                        PHOTOGRAPHIC ENLARGER
                        Filed May 5, 1943              2 Sheets-Sheet 2
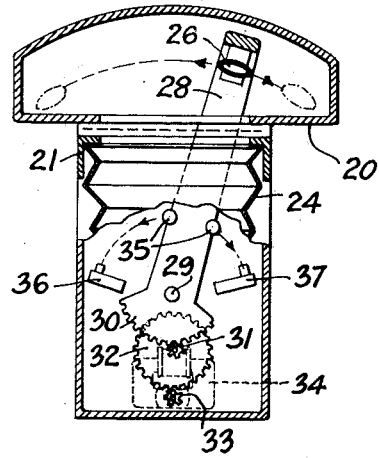
Fig:4
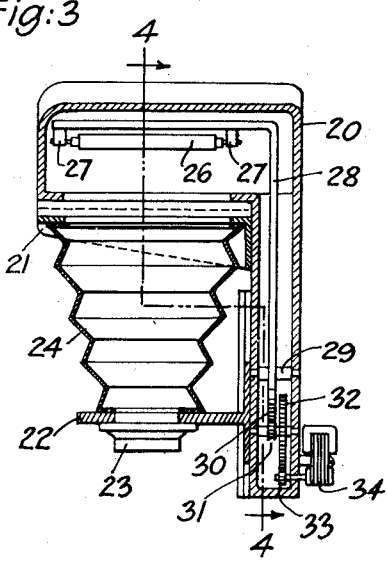
Fig:3
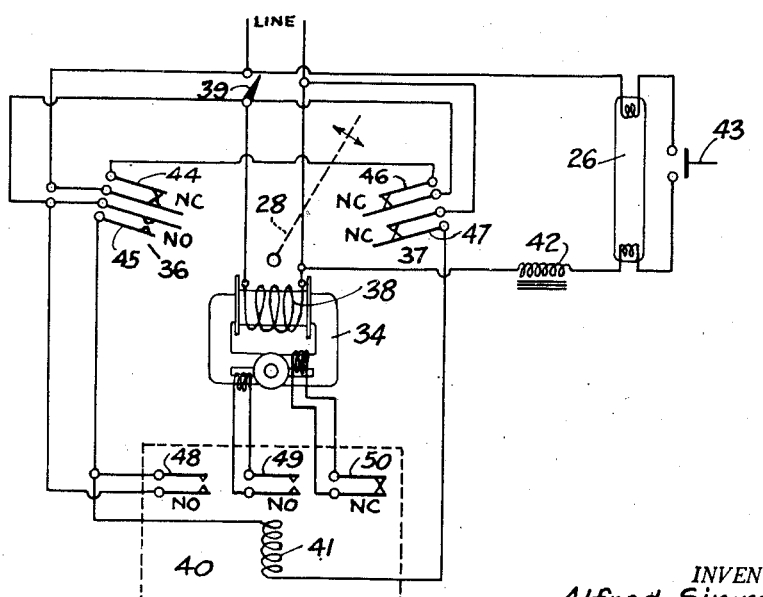
Fig:5
INVENTOR:
Alfred Simmon
BY Walter E. Wollheim
ATTORNEY.

Patented July 11, 1944

2,353,512

UNITED STATES PATENT OFFICE 2,353,512

PHOTOGRAPHIC ENLARGER

Alfred Simmon, Jackson Heights, N. Y.

Application May 5, 1943, Serial No. 485,686

4 Claims. (Cl. 88—24)

A photographic enlarger consists essentially of a projector assembly mounted on a suitable stand. The projector assembly comprises means to support a photographic negative, means to illuminate this negative with a substantially uniform intensity per unit area, and a focusable lens.

In the past, tungsten filament incandescent lamps were universally used as sources of light, and the more efficient type of enlargers used condenser lenses to render the illumination uniform. While the light distribution of such a system is quite satisfactory, its efficiency is low. This is due to the fact that photographic bromide paper is sensitive to blue and violet light only and that the light output of incandescent tungsten filament lamps is very low in that spectral region, most of the light emission being in the red and yellow region of the spectrum.

A much more efficient source of illumination became available with the invention of fluorescent lamps. Not only is the general efficiency of these lamps higher, but it is also possible, by choosing a suitable fluorescent substance, to render the color of the emitted light predominantly blue.

Immediately after the invention of fluorescent lamps, attempts were made to use them in photographic enlargers. Heretofore these attempts have not been fully successful because it is difficult to render the illumination sufficiently uniform over the negative area. Fluorescent lamps are of substantially cylindrical shape and relatively long, the shortest available types being about 6" long, consequently the conventional condenser lenses cannot be used. Cylindrical lenses are possible in theory but good cylindrical lenses would be prohibitively expensive. Cylindrical parabolical reflectors have been tried but were not satisfactory because then the negative is illuminated not only by the light reflected by the reflector, but also by the direct rays emitted by the lamp, which result in a light streak in the middle of the image. Therefore, existing enlargers using fluorescent lamps simply use a plurality of these lamps, usually 4, approximately evenly spaced over the negative area, and the light is distributed more or less uniformly by means of a light dispersing medium such as a piece of opal glass which is interposed between the negative and the lamps. This arrangement is workable but not entirely satisfactory. In the first place, a plurality of lamps with their associated ballast coils and starters is quite expensive. In the second place, the interposed light dispersing screen absorbs approximately two thirds or more of the light and even then complete uniformity cannot be obtained.

Another problem that arises in connection with fluorescent lamps is how to terminate the exposure time. Incandescent lamps are simply switched on and off, and while it is possible to devise an electrical circuit which will start a fluorescent lamp without time delay, this method is not satisfactory since it takes several minutes before a fluorescent lamp attains its full light output. Inasmuch as the light output of a fluorescent lamp more than doubles during its first two minutes of operation, it is necessary to leave fluorescent lamps on at all times and provide a mechanical shutter to control the exposure time.

It is the purpose of this invention to provide an illuminating system for photographic enlargers which is free from the handicaps outlined above. I accomplish this by moving the cylindrical fluorescent lamp during the exposure in a direction substantially at right angles to its longer axis.

The movement of the lamp starts beyond the margin of the negative, sweeps over the entire negative area, and is terminated at a point beyond the other margin of the negative. In this manner I can dispense with all light dispersing screens with their high light absorption. I need only one lamp, which is economical, and I obtain a degree of light uniformity which is far superior to that obtainable by other means. If the stroke of the lamp movement is sufficiently long, the lamp will at the beginning and at the end of its movement be so far beyond the margins of the negative area that practically no light leaches the lens and the bromide paper, and therefore no additional shutter means are necessary.

The lamp may be moved during the exposure by any suitable mechanism which is preferably driven by a small electrical motor.

In the following a typical enlarger embodying these principles is described, but it will be understood that this is merely an example and that any system which moves a lamp during the exposure to cause a uniform light distribution shall be considered to fall within the scope of the appended claims.

Referring to the accompanying drawings,

Fig. 1 is a side view of the enlarger;

Fig. 2 is a horizontal cross-sectional view through the projector assembly along the plane of line 2—2 in Fig. 1, partly in elevation and some of the parts projecting exteriorly from the assembly having been omitted;

Fig. 3 is a longitudinal section through the projector assembly;

Fig. 4 is a vertical cross-sectional view through the projector assembly along the plane of line 4—4 in Fig. 3, some of the parts being shown in elevation; and Fig. 5 is a wiring diagram of the circuit employed in the enlarger.

Like numbers of reference denote similar parts throughout the several views and the following specification.

As shown in Fig. 1, the enlarger has a base 11, usually a wooden board. A support 12 is mounted on this board for an upright stand 13. This stand may be vertical or, preferably, inclined slightly, as shown, so that the center line of the projector assembly is farther away from support 12 for larger prints than for smaller ones. This upright stand is composed of two steel plates 14 which are connected by suitable channels 15, as clearly shown in Fig. 2. The projector assembly is slidably mounted on this structure.

The projector assembly consists of a carriage and the projector proper. The carriage consists of two steel plates 16 which are bolted together by four studs 17. These studs serve at the same time as shafts for eight rollers 18. Springs 19 are provided by means of which the entire assembly is counterbalanced.

The entire structure as described is substantially identical with structures described in Patents #2,222,185, #2,239,760, and #2,262,972, issued to Rudolph Simmon.

Mounted between steel plates 16 of the projector carriage is the projector proper which consists of a housing 20, see Fig. 3, which contains the moving lamp assembly, the film stage 21, the lens holder 22, the lens 23, and the bellows 24, which form a flexible but light-tight connection between film stage 21 and lens holder 22. Lens holder 22 can be moved vertically in order to focus the lens and a knob 25, see Fig. 1, is provided for this purpose. The focusing movement itself may comprise a rack and pinion movement or the like and is not shown in detail since it does not form part of this invention. The negative is supported by a negative holder of conventional design which is not shown in the drawings. It may be identical or similar to the ones shown in Patents #2,239,760 and #2,262,972 issued to Rudolph Simmon. During the exposure it is inserted between the film stage and the lamp housing and its position is indicated by a dotted line 26 in Figs. 3 and 4.

The fluorescent lamp and its associated mechanism is contained within housing 20. 26 is the fluorescent lamp itself which is preferably but not necessarily of elliptical cross-section, the rear surface of which, i. e., the surface not facing the negative, may be preferably coated with silver or some other reflecting surface in order to increase the light output in the forward direction. The fluorescent lamp is supported by two sockets 27 which are mounted on a lever 28 which has a shape of an inverted L. This lever 28 is pivoted on point 29 so that the fluorescent lamp describes a flat arc which can be seen in Fig. 4. The two end positions are indicated by elliptical figures drawn in dotted lines. Theoretically the movement of the lamp should, of course, be a straight line, but the flat arc as shown is a sufficiently accurate approximation. As a matter of fact, it is even slightly better than a straight line since in this manner the center of the negative receives a little less light than the edges. This is desirable since in this manner the "vignetting" effect of the photographic lens can at least be partly compensated for.

The lower part of lever 28 is provided with gear teeth 30 which mesh with a small pinion 31 which in turn is connected to a larger gear 32 which in turn is driven by another small pinion 33. Pinion 33 is mounted on the shaft of a small electrical motor 34 which is shown in Figs. 1, 3 and 4.

Two studs 35 are mounted on lever 28, see Fig. 4. Two switches 36 and 37 are mounted within the housing in such a position that they are depressed, respectively, by studs 35 whenever lever 28 reaches one of its extreme positions.

The wiring diagram is shown in Fig. 5. The motor 34 is a small reversible so-called "shaded pole motor." A stack of laminations is surrounded by a main coil 38 which is energized by the ordinary 110 volt 60 cycle current. Two small shading coils are provided and the circuit is arranged in such a manner that either one or the other is shorted causing the motor to rotate in a clockwise or a counter-clockwise direction, respectively. Switch 36 consists of two pairs of contacts, 44 which is normally closed (NC) and 45 which is normally open (NO). In the same manner switch 37 consists of two pairs of contacts 46 and 47, but both pairs are normally closed.

In addition to switches 36 and 37 and motor 34 the circuit comprises a main switch 39 and a relay 40. The relay has a coil 41 and three pairs of contacts, 48 and 49 which are normally open and 50 which is normally closed.

I have also shown the circuit for the fluorescent lamp which consists of the lamp 26 itself, and a ballast coil 42, and a starting push button 43. These elements are quite conventional and are merely shown for the sake of completeness.

The function of this circuit is as follows:

The operator closes switch 39 and keeps it closed for the duration of the exposure. This causes the motor to rotate in either the clockwise or the counter-clockwise direction until it depresses one of the switches 36 or 37. Let us assume that lever 28 first depresses switch 36. This closes the lower of the two contacts, energizing coil 41 of the relay. The relay attracts the armature, closing contacts 48 and 49 and opening contact 50. Contact 48 is in parallel to contact 45, i. e., it is a so-called "hold-in" contact, keeping the relay coil 41 energized even after contact 45 has been opened again. The opening of contact 50 stops the clockwise rotation of motor 34, and the closing of contact 49 starts the counter-clockwise rotation, consequently lever 28 moves now in the opposite direction until it depresses switch 37. This opens contact 47 which interrupts the current energizing relay coil 41, i. e., the relay drops out, opening contacts 48 and 49 and closing contact 50. Opening of contact 49 causes the motor to stop rotating in a counter-clockwise direction, and closing of contact 50 causes the motor to start in a clockwise rotation again.

It is obvious that in this manner, lever 28 will oscillate between the two extreme positions as long as switch 39 is closed.

It is desirable to provide means by which the movement of lever 28 can be terminated only in either one of its extreme positions, but not during its stroke, since in this manner the bromide paper would show a pronounced trace of the lamp in whatever position the lamp happens to come to a stop. For that purpose I have arranged contacts 44 and 46. These contacts are normally closed and are in series with each other and in parallel to main switch 39. It will be clear that when the operator opens switch 39 the motor will still be energized by the current passing through contacts 44 and 46, but as soon as lever 28 depresses either one of these contacts, the circuit will be opened, the motor will stop rotating, and lever 28 will come to a stop in either one of the two extreme positions.

The system disclosed herein is extremely efficient. I have found that a blue 6 watt fluorescent lamp gives exposure times approximately one third of those necessary with the conventional enlarger using a 75 watt incandescent lamp and condensers.

While I have shown and described an enlarger employing the principles of my invention by way of example only, as a typical embodiment, it is obvious that the same can be modified. It is understood therefore that many changes of form, proportions and details of construction may be resorted to without departing from the principles or sacrificing any of the advantages of the invention as defined in the appended claims.

What I claim as new, is:

1. In a photographic enlarger, a support, a carriage movable upon said support, a housing fastened to said carriage, a negative, a negative holder supported by said carriage having an aperture, a lens supported by said carriage, a lamp within said housing, and means to oscillate the lamp during exposure relative to the negative, the extreme positions of said lamp being within the housing and beyond said aperture, whereby light through said aperture is prevented from reaching the lens.

2. In a photographic enlarger, a support, a carriage movable upon said support, a housing fastened to said carriage, a negative, a negative holder supported by said carriage having an aperture, a lens supported by said carriage, a fluorescent lamp within said housing, and means to move the lamp during exposure relative to the negative in angular relation to the long axis of the lamp from one side of the aperture to the other, the extreme positions of the lamp being within the housing and beyond said aperture, whereby light is prevented from reaching the lens.

3. In a photographic enlarger, a support, a carriage movable upon said support, a housing fastened to said carriage, a negative, a negative holder supported by said carriage having an aperture, a lens supported by said carriage, a fluorescent lamp within said housing, an arm supporting said lamp, means to move said lamp during exposure relative to the negative and in angular relation to the long axis of the lamp including an electric motor operatively connected to said arm, said arm adapted to oscillate said lamp within the housing from beyond one side of said aperture to beyond its other side, and limit switches adapted to bring said lamp to a stop in either of its two extreme positions beyond said aperture when light through said aperture is prevented from reaching the lens.

4. In a photographic enlarger, a support, a carriage movable upon said support, a housing fastened to said carriage, a negative, a negative holder supported by said carriage having an aperture, a lens supported by said carriage, a fluorescent lamp of substantially elongated form within said housing, an arm supporting said lamp above said negative, an electric motor operatively connected to and adapted to oscillate said arm to bring said lamp from a position within the housing beyond one side of said aperture to a position within the housing beyond its other side, and limit switches cooperating with said arm to cause said lamp to come to a stop in either of the said two positions when light through said aperture is prevented from reaching the lens.

ALFRED SIMMON.